May 7, 1957 L. HENNEBERGER 2,791,029
PIE TOP CUTTER
Filed Feb. 2, 1956
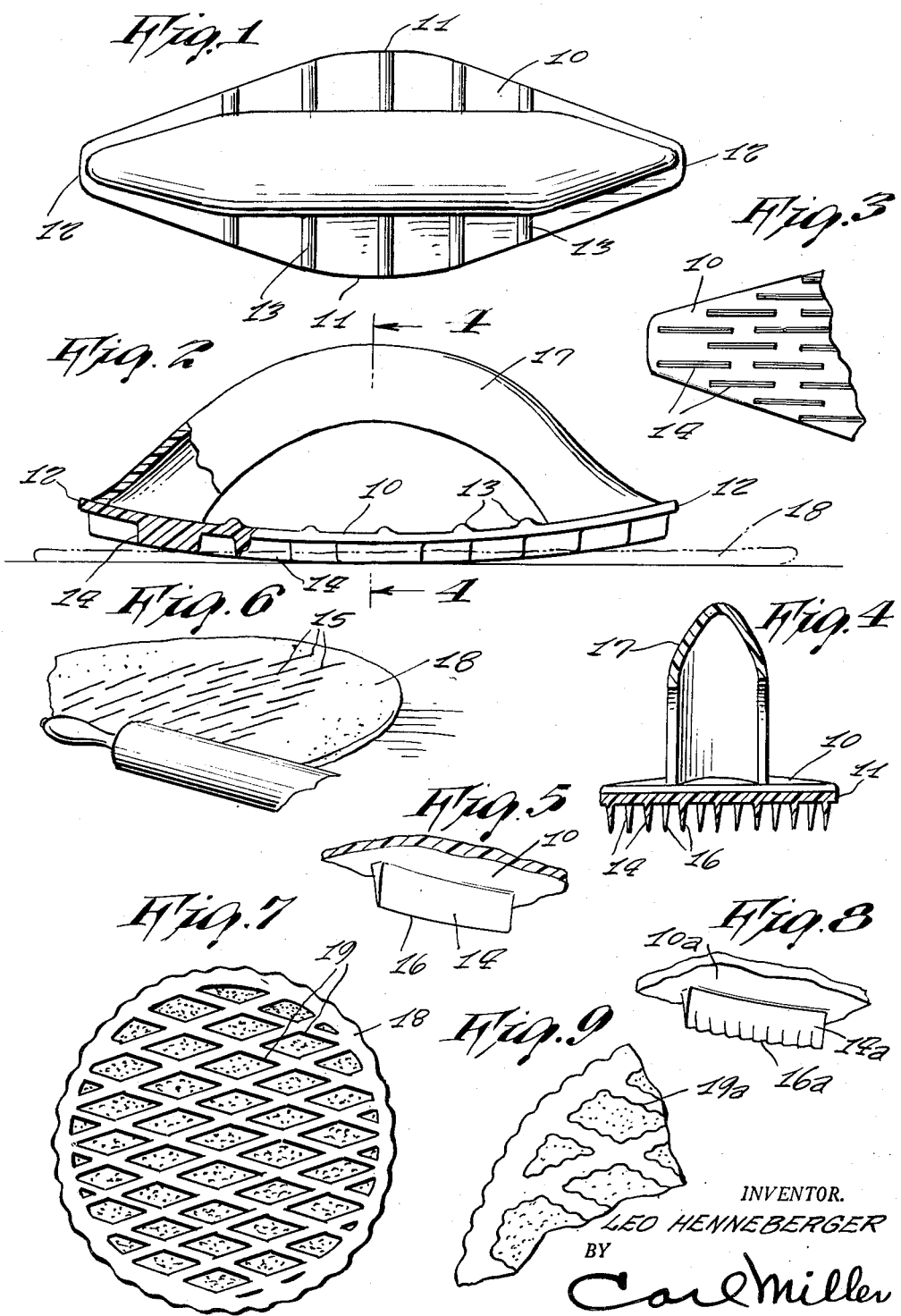
INVENTOR.
LEO HENNEBERGER
BY
Carl Miller
ATTORNEY

United States Patent Office 2,791,029
Patented May 7, 1957

2,791,029
PIE TOP CUTTER
Leo Henneberger, Brooklyn, N. Y.

Application February 2, 1956, Serial No. 562,974

3 Claims. (Cl. 30—305)

This invention relates to pie top cutters.

It is an object of the present invention to provide a pie top cutter adapted to cut in a pie top lattice work to make the same fanciful and wherein the forming of the lattice is done by a simple rocking operation of the tool.

It is another object of the present invention to provide a pie top cutter of the above type which is formed entirely of two unitary plastic members and which will effect an economy of labor, time and material for bakers, enabling them to make more attractive pies at a lower cost.

It is still another object of the present invention to provide a pie top cutter with a rocking construction so that when in operation the dough is cut row by row and is automatically released row by row, as a result of which the dough will not adhere to the knives of the cutter.

Other objects of the invention are to provide a pie top cutter bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a top plan view of a preferred embodiment of the present invention;

Figure 2 is a side elevational view thereof shown partly in section;

Figure 3 is a fragmentary bottom plan view of the invention;

Fig. 4 is a vertical sectional view taken along the line 4—4 of Fig. 2.

Fig. 5 is a fragmentary bottom perspective view of one of the cutters;

Fig. 6 is a fragmentary perspective view showing the product of the device at an intermediate stage;

Fig. 7 is a top elevational view of the pie top in the final stage;

Fig. 8 is a view similar to Fig. 5 of a modified form of the present invention; and Fig. 9 is a fragmentary top plan view of the modified pie top produced with the cutter of Fig. 8.

Referring now more in detail to the drawing, 10 represents a substantially diamond-shaped base member having the flattened side portions 11 and end portions 12, the base member 10 being formed of plastic and being of arcuate cross section in a longitudinal direction for a purpose which will hereinafter become clear. The upper surface of the base member 10 is integrally formed with the longitudinally spaced, parallel, laterally extending ribs 13 for strengthening purposes. The undersurface of the base member 10 is integrally formed with the cutter blades 14 (Fig. 5) extending over substantially the entire surface thereof, the blades 14 being provided in laterally spaced rows extending longitudinally, alternate rows being staggered with respect to each other to provide the cuts 15 of Fig. 6 in a manner which will hereinafter become clear. It will be noted that the opposite sides of the cutters 14 converge towards their lower cutting edge 16 (Fig. 5).

A handle is provided and includes an arcuate shaped hollow member 17 of U-shaped cross section (Fig. 4), the ends of the handle 17 being cemented or otherwise secured to the base member 10. The handle 17 is preferably formed of the same material as the base member 10, i. e. plastic.

In operation, the device is rocked back and forth on the circular dough 18 to impart thereto the staggered cuts 15 (Fig. 6). The dough is then spread over the pie (Fig. 7) to provide the lattice openings 19 which are formed from the cuts 15 upon stretching the dough, as will be obvious. Lattice top pies can thus be formed with an economy of time and to increase the attractiveness of the pie.

Referring now particularly to Figs. 8 and 9, there is shown a modified form of the present invention wherein the base member 10a is integrally formed with the cutters 14a having serpentine edges 16a whereby to provide the lattice openings 19a of Fig. 9.

In other respects the form of the invention shown in Figs. 8 and 9 is the same as that shown in Figs. 1 through 7.

While various changes may be made in the detail construction, it shall be understood that such changes shall be within the spirit and scope of the present invention as defined by the appended claims.

Having thus set forth and disclosed the nature of my invention, what is claimed is:

1. A pie top cutter comprising an elongated rocking member of rigid construction having a concave upper surface and a downwardly facing convex surface arched about an axis transverse to the longitudinal dimension of said member, rigid cutter means fixed to and extending downwardly from said convex surface to a substantially uniform extent and including a plurality of substantially rectangular cutting blades integrally formed on the under surface of said member in laterally spaced, longitudinally extending rows, the cutting blades in alternate rows being staggered with respect to the cutting blades in the other rows, and the opposite sides of all of the cutting blades converging toward the lower cutting edges thereof.

2. A pie top cutter according to claim 1, wherein the elongated rocking member is a substantially diamond-shaped plate.

3. A pie top cutter according to claim 2, wherein the cutting blades are formed with serpentine cutting edges effective to produce a jagged lattice-work in the pie top.

References Cited in the file of this patent

UNITED STATES PATENTS

| 483,002 | Jordan | Sept. 20, 1892 |
| 2,046,334 | Loeber | July 7, 1936 |
| 2,304,759 | Carroll | Dec. 8, 1942 |
| 2,618,852 | Clough | Nov. 25, 1952 |
| 2,694,221 | Dura | Nov. 16, 1954 |

FOREIGN PATENTS

| 13,187 | Great Britain | June 26, 1905 |